(12) United States Patent
Sanderson et al.

(10) Patent No.: US 8,104,713 B2
(45) Date of Patent: Jan. 31, 2012

(54) REINFORCED INFLATABLE WINGS FOR FITMENT-CONSTRAINED AIR VEHICLES

(75) Inventors: Terry M. Sanderson, Tucson, AZ (US); Rudy A. Eisentraut, Tucson, AZ (US); David B. Hatfield, Oracle, AZ (US)

(73) Assignee: Raytheon Company, Waltham, MA (US)

( * ) Notice: Subject to any disclaimer, the term of this patent is extended or adjusted under 35 U.S.C. 154(b) by 435 days.

(21) Appl. No.: 12/406,173

(22) Filed: Mar. 18, 2009

(65) Prior Publication Data
US 2010/0237192 A1   Sep. 23, 2010

(51) Int. Cl.
  *B64C 3/54* (2006.01)
(52) U.S. Cl. .................... 244/123.11; 244/218
(58) Field of Classification Search ............. 244/123.11, 244/35 R, 123, 218, 219, 46, 49
See application file for complete search history.

(56) References Cited

U.S. PATENT DOCUMENTS

| | | |
|---|---|---|
| 2,616,509 A | 11/1952 | Wilfred |
| 2,979,287 A * | 4/1961 | Ross .............................. 244/219 |
| 3,633,846 A | 1/1972 | Biggs |
| 3,957,232 A | 5/1976 | Sebrell |
| 4,725,021 A | 2/1988 | Priddy |
| 4,858,854 A | 8/1989 | Jacobson |
| 6,015,115 A * | 1/2000 | Dorsett et al. ................. 244/219 |
| 6,082,667 A * | 7/2000 | Haggard ...................... 244/35 R |
| 6,199,796 B1 * | 3/2001 | Reinhard et al. ............ 244/35 R |
| 6,347,769 B1 * | 2/2002 | To et al. .......................... 244/219 |
| 6,398,160 B1 * | 6/2002 | Hsia .............................. 244/35 R |
| 6,443,394 B1 * | 9/2002 | Weisend, Jr. ............... 244/134 A |
| 7,140,576 B2 | 11/2006 | Logosz |
| 7,185,851 B2 | 3/2007 | Elam |
| 2009/0206196 A1 * | 8/2009 | Parks et al. ...................... 244/49 |

FOREIGN PATENT DOCUMENTS
DE  3916690 C1  10/1998
FR  2613474 A1  10/1988
* cited by examiner

*Primary Examiner* — Benjamin P Lee
(74) *Attorney, Agent, or Firm* — Eric A. Gifford

(57) ABSTRACT

A reinforced inflatable wing improves the tolerance of the OML and reinforces the wing in at least the high load areas. This approach provides fitment constrained air vehicles with wings having increased surface area to improve flight endurance or aerodynamic control. A wing box forms a first portion of the wing. A skin having a plurality of rigid plates affixed thereto is inflated to form a second portion of the wing to either increase the chord length or lengthen the wing span. The skin is suitably inflated with foam to form a solid wing.

22 Claims, 11 Drawing Sheets

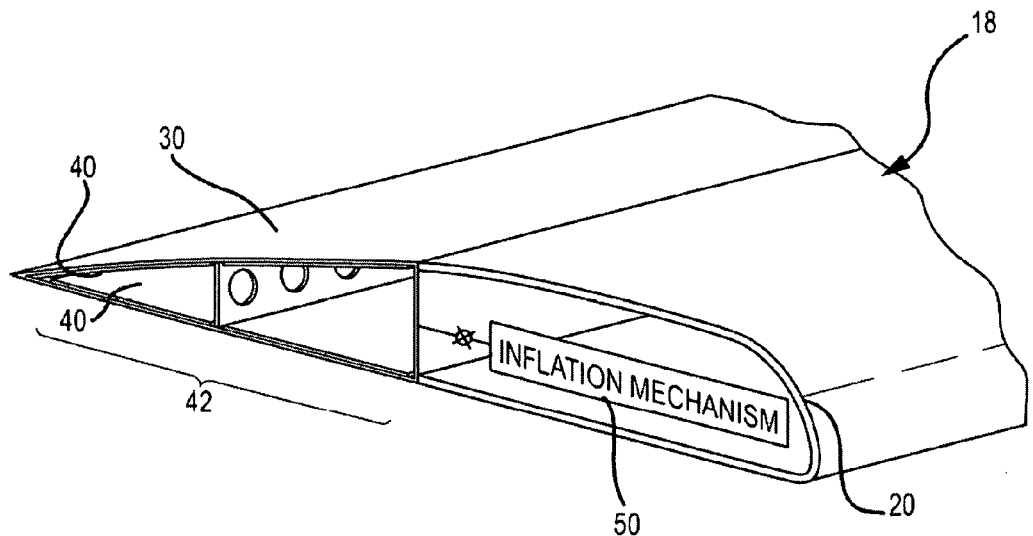
FIG.2a
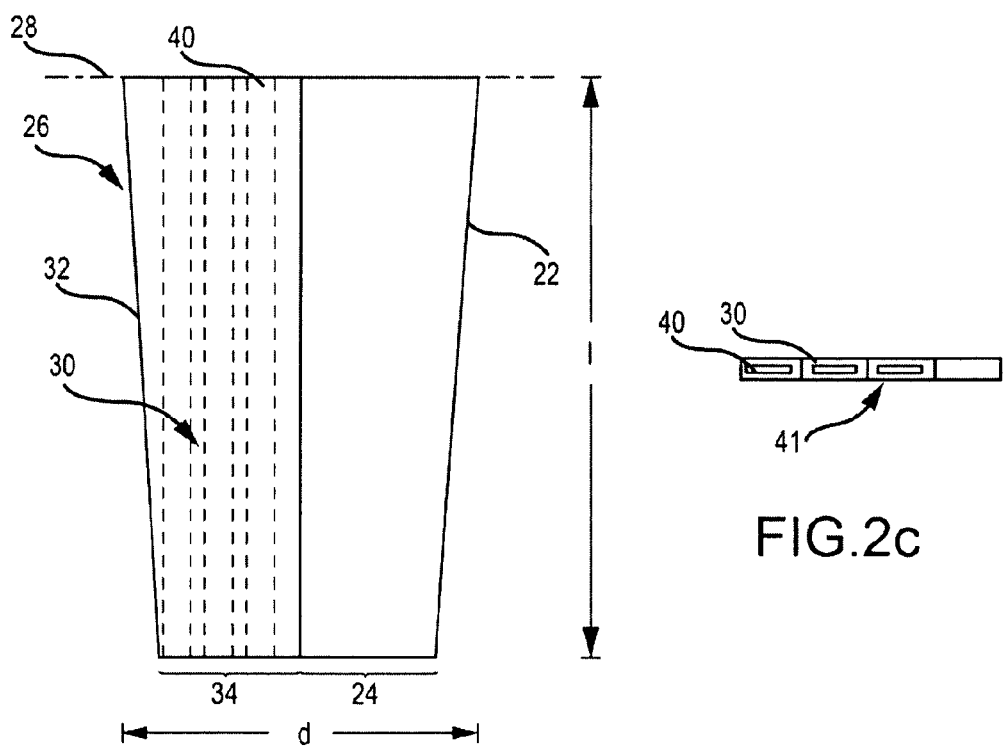
FIG.2b
FIG.2c

WING RETRACTED

WING EXTENDED

REINFORCED INFLATABLE WINGS FOR FITMENT-CONSTRAINED AIR VEHICLES

BACKGROUND OF THE INVENTION

1. Field of the Invention

This invention relates to wings for fitment-constrained air vehicles, and more particularly to wings for tube and pylon launched missiles, projectiles and unmanned aerial vehicles (UAVs).

2. Description of the Related Art

Air vehicles such as missiles, projectiles and unmanned aerial vehicles (UAVs) are often launched from ground, air or sea based tube or pylon launch platforms. These vehicles range from a fraction of a pound for small UAVs to upwards of 10,000 pounds for large cruise missiles and munitions, and fly with speeds ranging from a few miles per hour to transonic, i.e. around Mach 1. These launch platforms are "fitment" constrained in space and volume e.g. the limited volume of a tube or the limited volume inside or under an airframe. To utilize the available space and volume, these vehicles typically employ retractable wings 10 that are stored inside the airframe 12 and deploy at launch as shown in FIGS. 1a and 1b. As used herein a "wing" is any aerodynamic surface that provides flight control and/or lift generation including wings, fins and canards.

Retractable wings are typically formed of machined aluminum. Machined aluminum wings can withstand the heavy loads imparted by transonic flight and/or rapid maneuvering. Machined aluminum is also easily machined to satisfy close tolerances on the "outer mold line" (OML) of the wing. A tight OML tolerance is critical to provide minimal disturbance in aerodynamic performance that could create roll/pitch moments, drag, Etc. However, the wings are limited to have a 'chord' length "d" less than the diameter of the vehicle and a span length "l" less than the length of the air frame in order to fully retract inside the air frame for storage.

As customer demands on the performance of these types of air vehicles increases and the fitment constraints are restricted further, the limitations on chord and span lengths provide inadequate endurance (range) and control to fly desired missions. By comparison, commercial manned aircraft typically have a chord length that 3×-4× the diameter of the airframe and a span length of 2× the length of the of the air frame to provide sufficient wing surface area to provide lift at low speeds for efficient flight and maneuverability.

Inflatable wings have been around and in limited use for about 40 years. Inflatable wings have been proposed for use in an inflatable escape plane for pilots and high-altitude high-endurance UAVs launched from space. These aerial vehicles are slow moving and precise control is not required. In high altitude loiter (HAL) vehicles the wing is folded and stored in a wing-box inside the airframe. To deploy, the wing-box jack knifes from the airframe and a gas canister inflates a skin around and attached to the wing-box. The skin inflates to a shape having the OML of the wing. The inflated wing can have a chord and/or span length larger than the fitment constraint of the airframe and a much larger total surface area. On the inflatable escape plane the entire plane inflates.

Inflatable wings are feasible for these limited applications in which high-speed, precise control and high wing loads are not required. However, despite considerable investment and prolonged efforts the industry has failed to produce an inflatable wing suitable for use in air vehicles such as the tube or pylon launched missiles, projectiles and general use UAVs. The primary issue being that the tolerance on the OML provided by inflating a bag is not good enough, typically no better than ¼ inch. For high speed vehicles with high wing loads and precise terminal flight performance requirements, the aerodynamic performance of inflatable wings is insufficient. The industry has tried different approaches to improve the OML tolerance including baffles in the skin and segmented inflatable wings, but to no avail. Furthermore, the gas-filled skin is not strong enough to withstand heavy loading. Even with its limitations on chord and span length, retractable aluminum wings remain the only viable solution for the fitment constrained air vehicles commonly used for missiles and munitions.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an improvement on the inflatable wing that improves the tolerance of the OML and reinforces the wing in at least the high load areas. This approach provides fitment constrained air vehicles with wings having increased surface area to improve flight endurance or aerodynamic control.

This is accomplished with a wing box having a shape and outer mold line (OML) to form a first portion of the wing extending from a wing root attached to the air frame along at least a portion of the wing span and extending aft along at least portion of the wing chord length. Typically, the wing box is stored within the air frame and deployed at launch. A skin having a shape and outer mold line (OML) of at least a second portion of the wing is attached to the wing box. A plurality of plates is affixed to corresponding locations on the skin. The skin and plates are folded and stored in a constrained volume with the wing box. An inflation mechanism is configured to deploy and inflate the skin to form the second portion of the wing and thereby assemble the rigid plates to reinforce a sub-portion of the wing. The reinforced sub-portion may be limited to only the high load areas of the wing such as the top and bottom wing surfaces along any leading or trailing edges of the inflated portion of the wing. Alternately, the reinforced sub-portion may encompass the entire inflated portion. The tolerance of the OML in at least the high load areas is now dictated by the rigid plates and not the skin. The mechanism may inflate the wing with polymer foam to form a solid wing portion. The inflated and reinforced portion of the wing may either increase the chord length or extend the span of the wing. The deployed wing has a surface area that is greater than the surface area of the wing box, typically at least 2×, and an OML tolerance in the high load areas of the wing that is sufficient to satisfy the control or endurance requirements of the flight vehicle.

In an embodiment, the wing box forms the leading edge of the wing. The skin and inserts are inflated aft of the wing box thereby increasing the chord length and reinforcing the trailing edge. The skin is suitably inflated with polymer foam that forms a solid wing reinforced along the trailing edge.

In an embodiment, the wing box forms a center region of the wing. The skin and inserts are inflated fore and aft of the wing box thereby increasing the chord length and reinforcing at least the trailing edge and possibly both the trailing and leading edges. The skin is suitably inflated with polymer foam that forms a solid wing reinforced along the trailing edge.

In an embodiment, the wing box forms an interior portion including the leading and trailing edges of the wing. A structure inside the wing box telescopes to form an extended center region of the wing. The skin and inserts are inflated fore and aft of the telescoped structure thereby increasing the span and reinforcing at least the trailing edge and possibly both the trailing and leading edges. The skin is suitably inflated with polymer foam that forms a solid wing reinforced along the trailing edge. The telescoping structure may either be fully extended and then inflate the skin or skin cells may be sequentially extruded as the structure extends.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 2a through 2c are views of a reinforced inflatable wing in accordance with the present invention;

DETAILED DESCRIPTION OF THE INVENTION

Figure 1A:
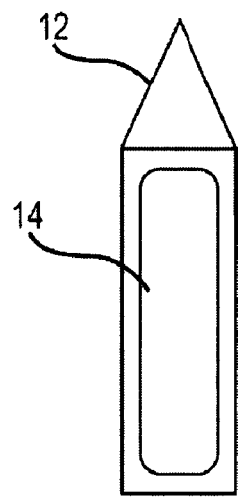
FIGS. 1a and 1b, as described above, illustrate a typical configuration for machined aluminum wings that deploy at launch.
Figure 1B:
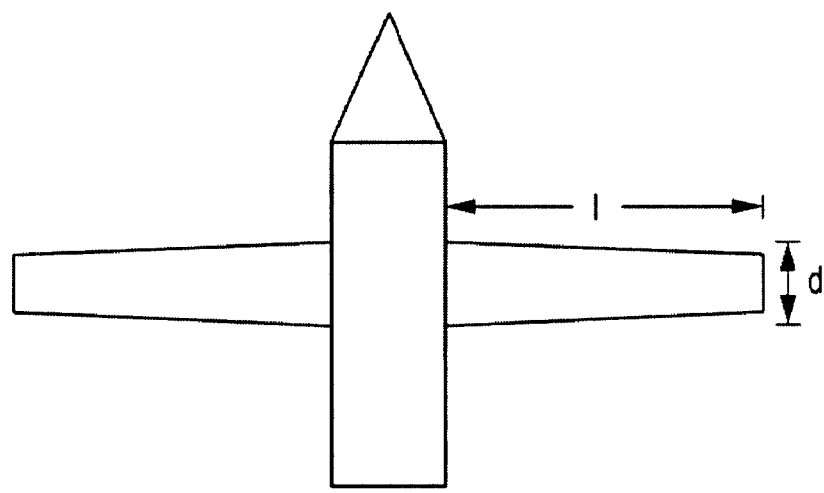
Figure 3A:
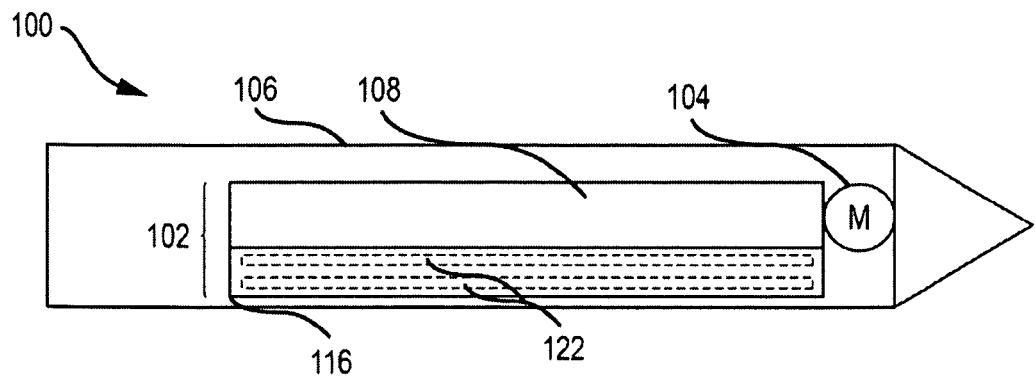
FIGS. 3a through 3e are various view of an embodiment depicting the deployment of a reinforced inflatable wing aft to increase chord length in accordance with the present invention.
Figure 3B:
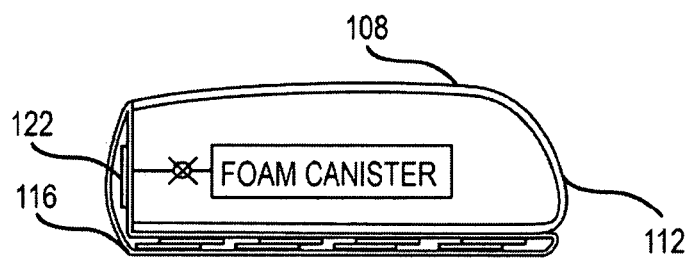
Figure 3C:
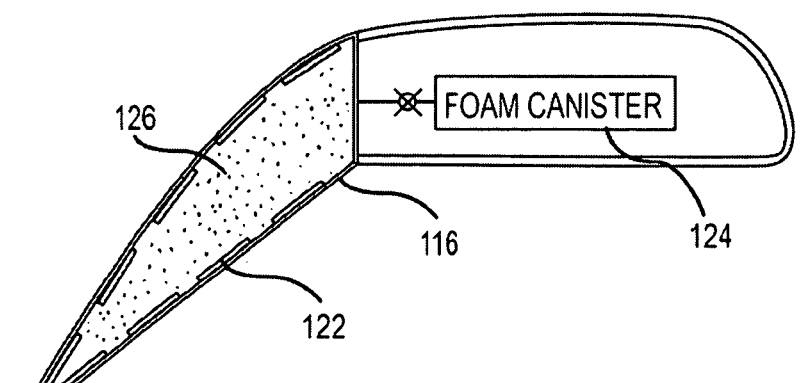
Figure 3D:
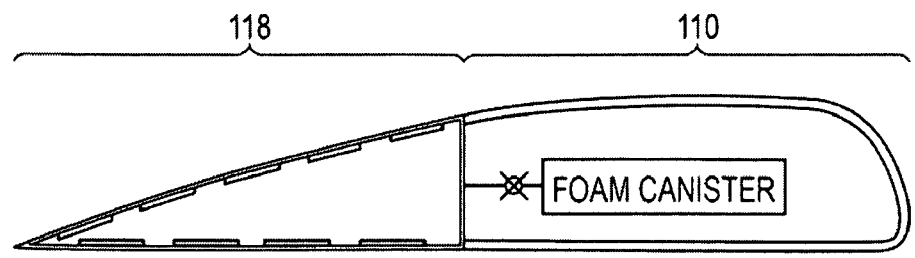
Figure 3E:
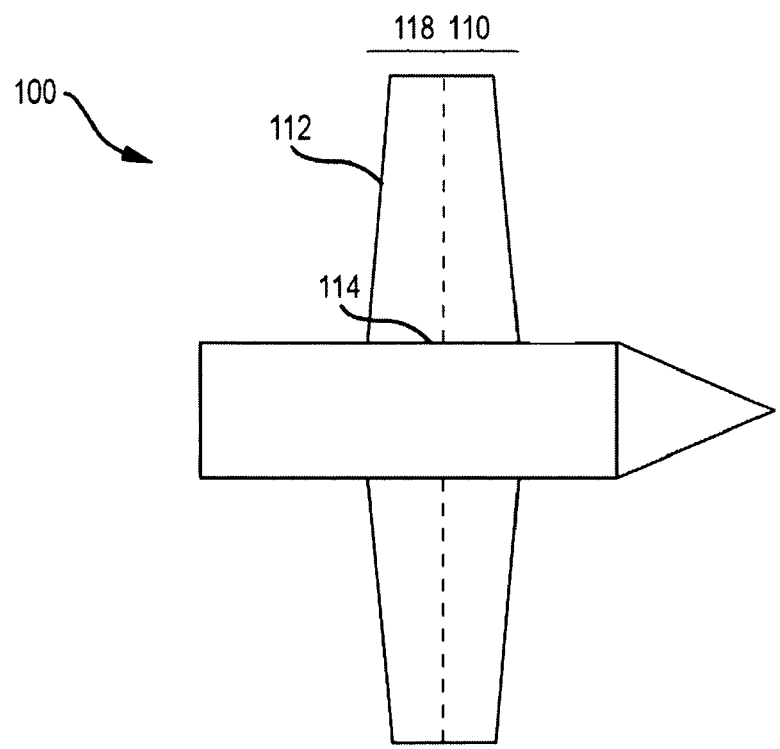
Figure 4A:
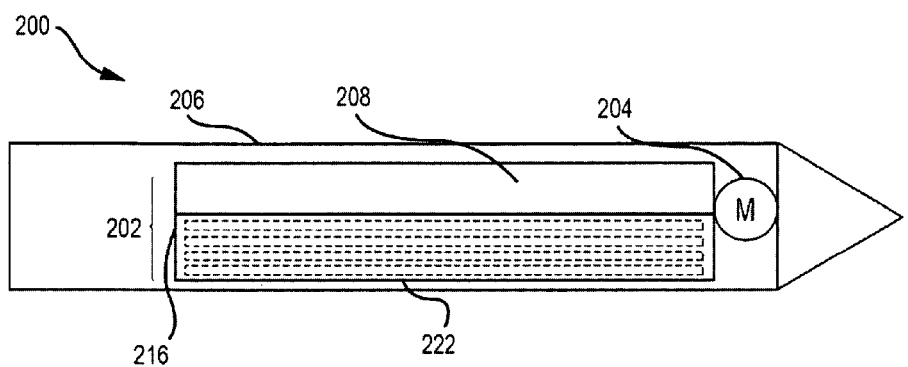
FIGS. 4a through 4e are various views of another embodiment depicting the deployment of a reinforced inflatable wing fore and aft to increase chord length in accordance with the present invention.
Figure 4B:
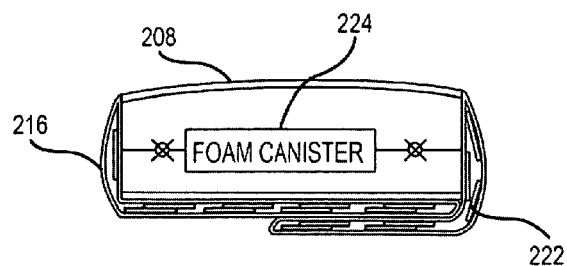
Figure 4C:
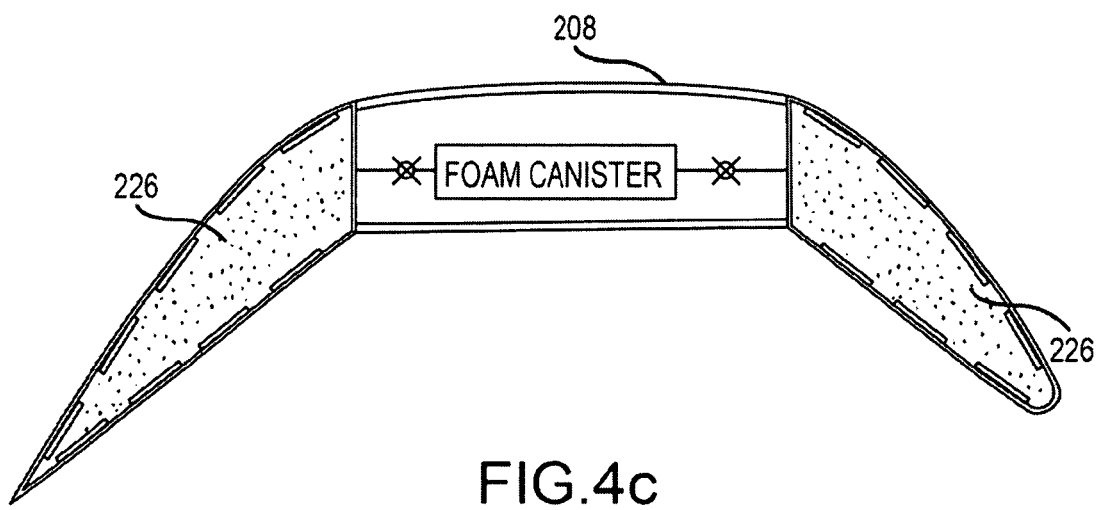
Figure 4D:
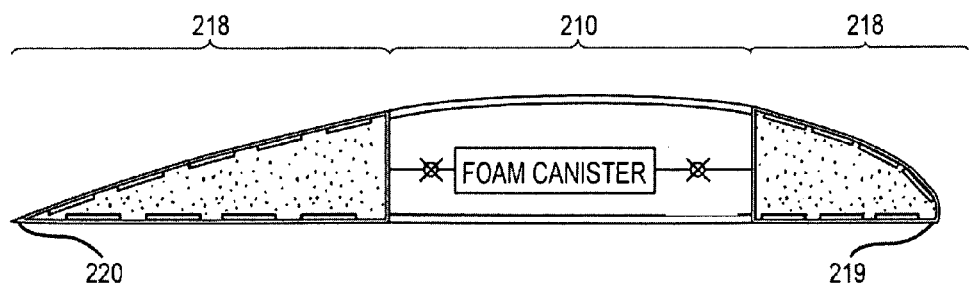
Figure 4E:
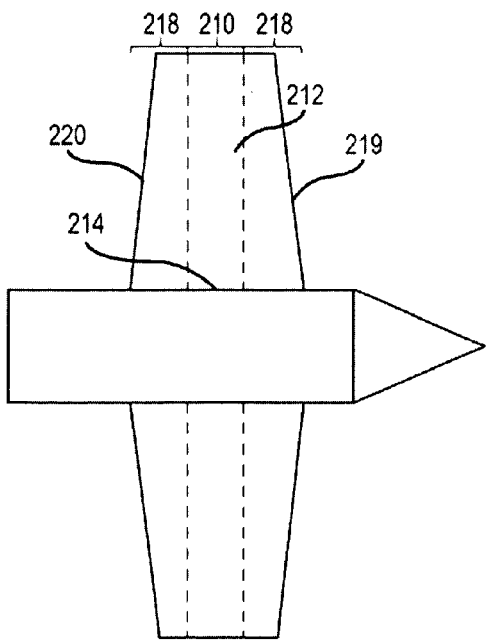

The present invention provides an improvement on the inflatable wing that improves the tolerance of the OML and reinforces the wing in at least the high load areas. This approach provides fitment constrained air vehicles with wings having increased surface area to improve flight endurance or aerodynamic control.

As shown in FIGS. 2a through 2c, a wing assembly 18 includes wing box 20 having a shape and outer mold line (OML) 22 to form a first portion 24 of the wing 26 extends from a wing root 28 attached to the air frame along at least a portion of the wing span "l" and extending aft along at least portion of the wing chord length "d". Typically, the wing box is stored within the air frame and deployed at launch. Alternately, the wing box could be a fixed wing "stub". The wing box is suitably formed from a solid metal such as machined aluminum or a composite material. To withstand the loads placed on the wing during flight it is necessary that a portion of the wing is formed from a stiff material that is anchored to the air frame at the wing root.

A skin 30 having a shape and OML 32 (when inflated) of at least a second portion 34 of the wing is attached to the wing box. Precisely where and how the skin is attached to the wing box will depend on what portion of the wing is formed by the skin and how the skin is deployed. The skin is formed from a pliable material such as a fabric, elastomer, shape memory polymer (SMP), SMP composites or other materials. The skin may define a single compartment or be segmented into individual cells.

A plurality of plates 40 are affixed to corresponding locations on the skin 30. For example, plates may be placed in individual pockets 41 formed in the skin 30. Alternately, the plates could be adhered directly to the skin. The plates are positioned so that when assembled upon inflation of the skin the plates reinforce a sub-portion 42 of the inflated second wing portion. Typically, the sub-portion covers at least the high-load areas of the inflated wing including the top and bottom surfaces of any leading or trailing edges. Alternately, the reinforced sub-portion may encompass the entire inflated portion. The plates may be flat or curved to conform to a desired wing shape. The plates may be of the same or different sizes. The precise configuration will depend on what wing surfaces are reinforced, constraints on folding the skin and how the skin is inflated.

The plates may be formed from a stiff material such as a metal, composite, ceramic or engineered plastic. Each plate may have the shape of a portion of the airfoil corresponding to its position on the wing. Alternately, each plate may be flat in which case the inflated wing is a piecewise linear approximation of the desired airfoil. Alternately, the plates may be "bi-stable". In a stored state the plates are flat for more efficient storage. In a deployed state each plate assumes the shape of its corresponding portion of the airfoil. A bi-stable plate may be formed, for example, using a shape memory alloy (SMA) or a multilayer metal/polymer structure in which the polymer layer is suitably patterned to provide the anisotropic properties needed to create the two states. At deployment, the plate is heated (e.g. resistive heating) to above a threshold temperature at which the SMA or metal/polymer structure changes state to assume the shape of the portion of the airfoil corresponding to their position on the wing.

The skin 30 and plates 40 are folded and stored in a constrained volume with the wing box. Depending upon the configuration, they may be stored above or below the wing box or inside the wing box.

An inflation mechanism 50 such as a pressurized foam canister positioned within the wing box is configured to deploy and inflate the skin 30 to form the second portion of the wing and thereby assemble the rigid plates 40 to reinforce the sub-portion of the wing. The tolerance of the OML 32 in at least the high load areas is now dictated by the rigid plates 40 and not the skin 30. The mechanism may inflate the wing with polymer foam to form a solid wing portion. The foam cures, hardens, sets or otherwise solidifies to form the solid wing portion. The foam may be injected pre-cured (pre cross-linked). The combination of the wing box with the inflated skin that is reinforced both with polymer foam and rigid plates provides a structurally sound wing capable of withstanding rigorous flight conditions. The inflated and reinforced portion of the wing may either increase the chord length "d" as shown in FIG. 2b or extend the span of the wing. The deployed wing has a surface area that is greater than the surface area of the wing box, typically at least 2×, and an OML tolerance in the high load areas of the wing that is sufficient to satisfy the control or endurance requirements of the flight vehicle.

There are many possible configurations of the wing box, skin, reinforcement plates and deployment mechanisms depending on the size of the air frame, speed, shape of the wing and mission requirements (e.g. endurance vs. precision control). Without loss of generality, we will illustrate and describe four exemplary embodiments. The first two embodiments increase the chord length of the wing while the last two embodiments extend the span of the wing. The drawings are simplistic representations of an air frame and wing structure for purposes of illustrating the invention and not necessarily complete. The design of the machined metal or composite wing box to form a portion of a wing is a modification of a conventional retractable wing. Furthermore, the deployment mechanism, a motor "M", to deploy the wing box is the same as that used to deploy a wing.

As illustrated in FIGS. 3a-3e, an air vehicle 100 includes a pair of wing assemblies 102 and a deployment mechanism 104 such as a motor "M" stored in an air frame 106. Only one of the wing assemblies 102 is depicted. The wing assemblies could be stored side-by-side or stacked. Each wing assembly 102 includes a wing box 108 that when deployed forms a first portion 110 of the wing including the leading edge 112 extending from the wing root 114. The wing box may suitably have the maximum chord length "d" and span "l" dimensions supported by a particular air frame. In other words, the first portion of the wing is as large as a conventional retractable wing. Each wing assembly 102 also includes a skin 116 attached aft of the wing box that when deployed forms a second portion 118 of the wing including the trailing edge 120 extending from the wing root 114. Plates 122 affixed to the skin reinforce at least a sub-portion including trailing edge 120 (in this embodiment the entire second portion). A foam canister 124 injects polymer foam 126 under pressure into skin 116 causing it to expand (See FIG. 3c) to its shape and OML and to assemble plates 122. The foam quickly solidifies to form a solid second portion 118 of the wing (see FIG. 3d). The reinforced inflatable wing increases the chord length of the conventional retractable wing (e.g. wing box), typically by a factor of at least 2×.

As illustrated in FIGS. 4a-4e, an air vehicle 200 includes a pair of wing assemblies 202 and a deployment mechanism 204 such as a motor "M" stored in an air frame 206. Only one of the wing assemblies 202 is depicted. The wing assemblies could be stored side-by-side or stacked. Each wing assembly 202 includes a wing box 208 that when deployed forms a first portion 210 of the wing including a center region 212 extending from the wing root 214. The wing box may suitably have the maximum chord length "d" and span "l" dimensions supported by a particular air frame. In other words, the first portion of the wing is as large as a conventional retractable wing. Each wing assembly 202 also includes a skin 216 attached fore and aft of the wing box that when deployed forms a second portion 218 of the wing including both leading edge 219 and the trailing edge 220 extending from the wing root 214. Plates 222 affixed to the skin reinforce at least a sub-portion including leading edge 219 and trailing edge 220 (in this embodiment the entire second portion). A foam canister 224 injects polymer foam 226 under pressure into skin 216 both fore and aft causing it to expand (See FIG. 4c) to its shape and OML and to assemble plates 222. The foam quickly solidifies to form a solid second portion 218 of the wing (see FIG. 4d). The reinforced inflatable wing increases the chord length of the conventional retractable wing (e.g. wing box), typically by a factor of at least 2×.

As illustrated in FIGS. 5a-5e, an air vehicle 300 includes a pair of wing assemblies 302 and a first deployment mechanism 304 such as a motor "M" stored in an air frame 306. Only one of the wing assemblies 302 is depicted. The wing assemblies could be stored side-by-side or stacked. Each wing assembly 302 includes a wing box 308 that when deployed forms a first interior portion 310 of the wing including both the leading and trailing edges extending from the wing root 312. The wing box may suitably have the maximum chord length "d" and span "l" dimensions supported by a particular air frame. In other words, the first portion of the wing is as large as a conventional retractable wing. Wing box 308 includes a telescoping structure 313 and a second deployment mechanism 314 such as a motor "M" to extend the telescoping structure. When extended the telescoping structure forms a center region 315 that extends outwards from the first portion (see FIG. 5b).

Each wing assembly 302 also includes a skin 316 attached fore and aft of the wing box that when deployed forms a second portion 318 of the wing including both leading edge 319 and the trailing edge 320 extending from the wing root 314. Plates 322 affixed to the skin reinforce at least a sub-portion including leading edge 319 and trailing edge 320 (in this embodiment the entire second portion). Once the telescoping structure has been deployed, a foam canister 324 injects polymer foam 326 under pressure into skin 316 both fore and aft causing it to expand to its shape and OML and to assemble plates 322. The foam quickly solidifies to form a solid second portion 318 of the wing (see FIG. 5d). The reinforced inflatable wing increases the wing span of the conventional retractable wing (e.g. wing box), typically by a factor of at least 2×.

Figure 5A:
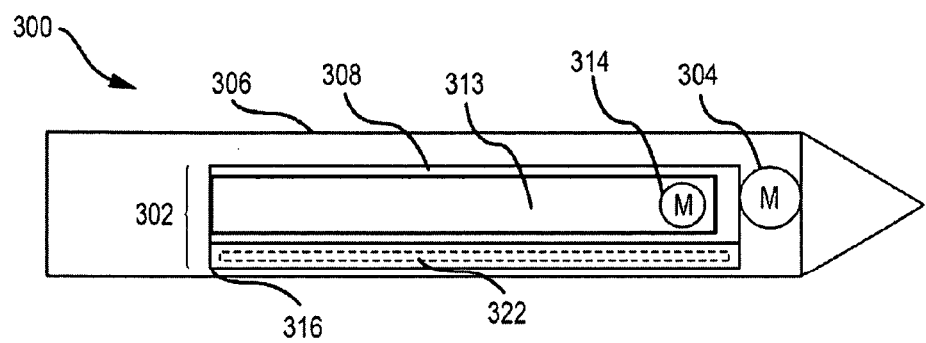
FIGS. 5a through 5e are various views of an embodiment depicting the deployment of a reinforced inflatable wing to increase wing span in accordance with the present invention.
Figure 5B:
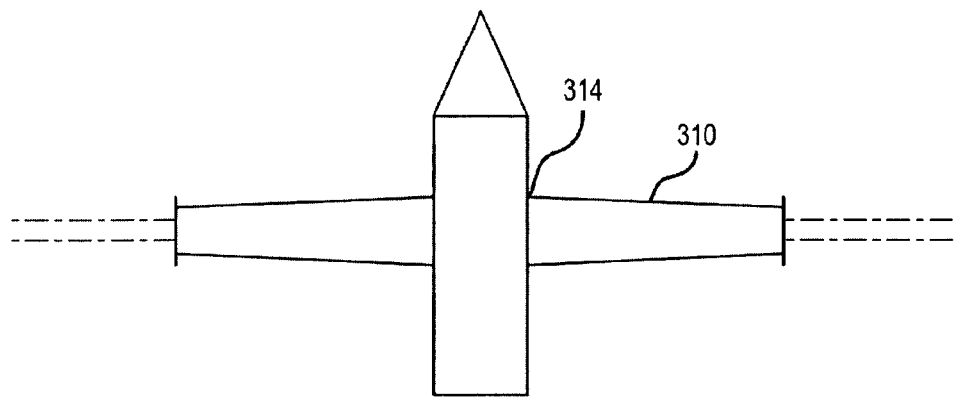
Figure 5C:
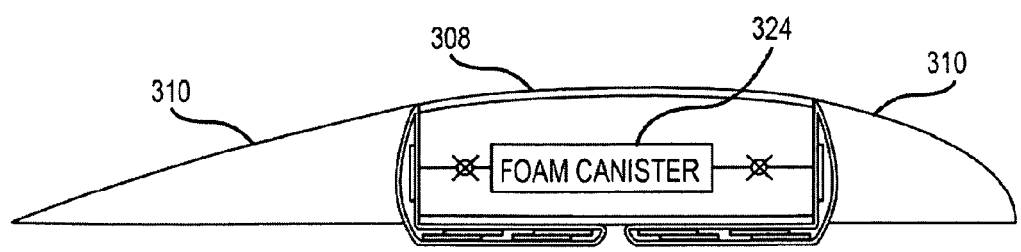
Figure 5D:
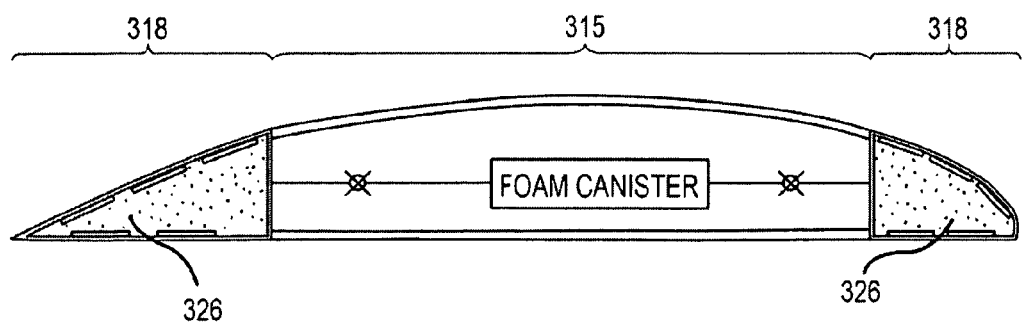
Figure 5E:
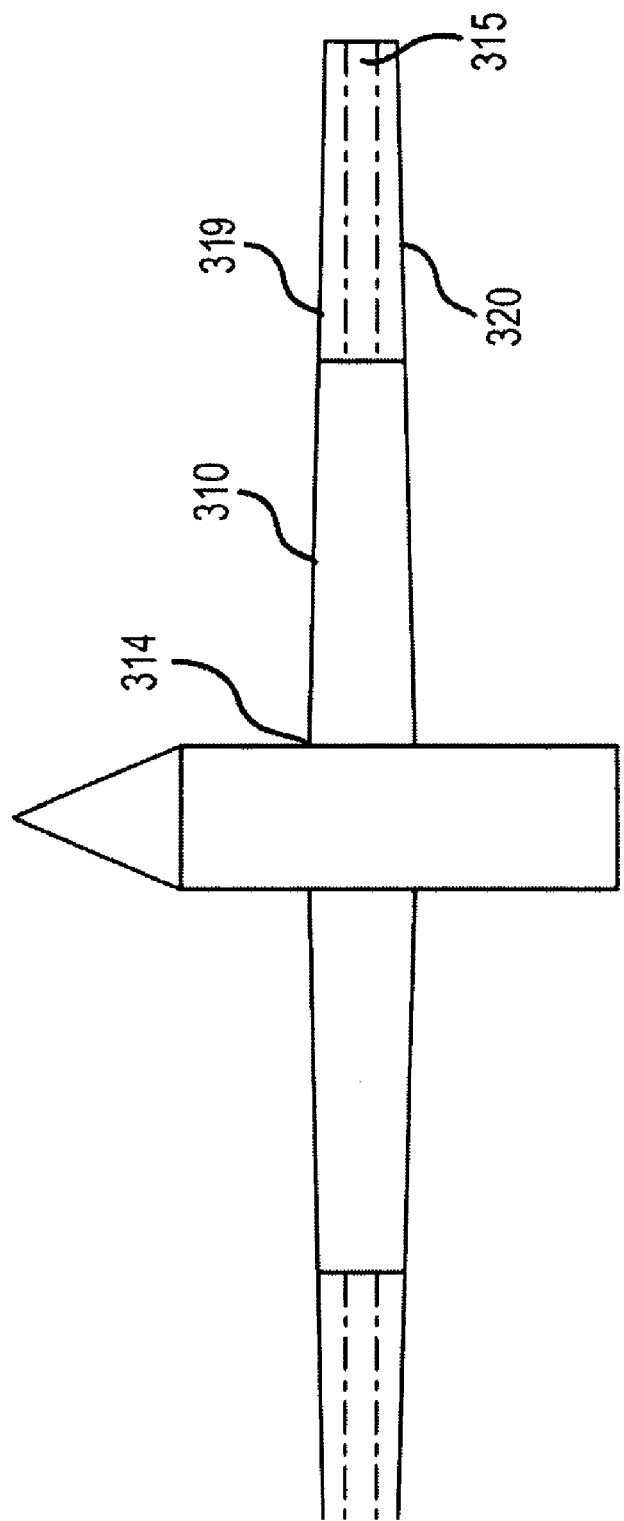
Figure 6A:
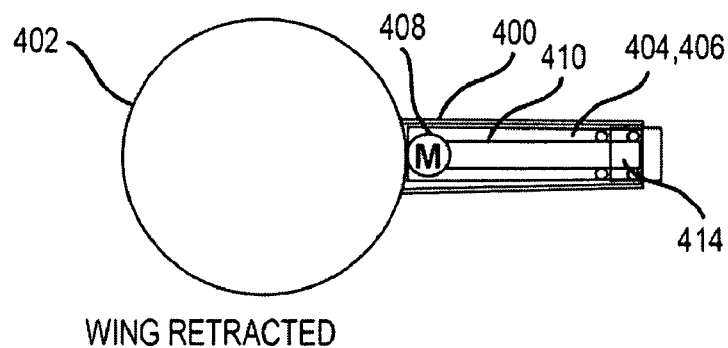
FIGS. 6a and 6b are sectional views of another embodiment the deployment of a reinforced inflatable wing to increase wing span in accordance with the present invention.
Figure 6B:
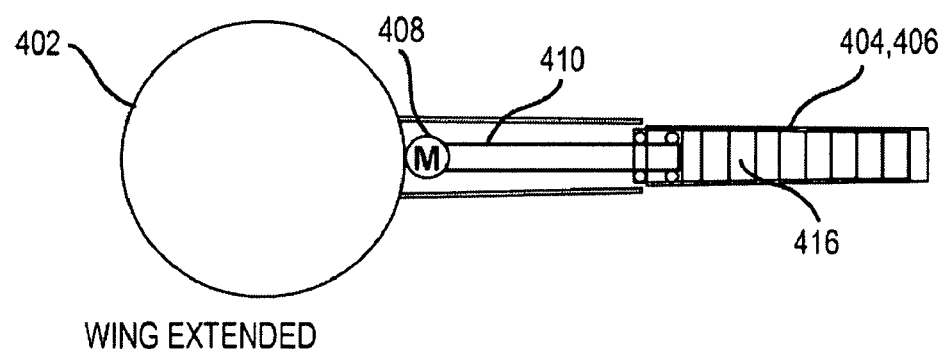

As illustrated in FIGS. 6a and 6b, a wing box 400 is deployed to extend length wise from an air frame 402 and form a first interior portion of the wing (similar to that shown in FIG. 5b). A skin 404 that is segmented into a plurality of self-contained cells is folded and stored in the wing box. Plates 406 are affixed to certain cells to reinforce high load surfaces. An actuator motor 408 extends a telescoping structure 410 from the wing box incrementally as a foam canister (not shown) extrudes foam through a "die" 414 to fill the cells sequentially. Cells 416 fore and aft of the center region are filled and solidify as the telescoping structure extends.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A wing for deployment from an air frame, comprising:
 a wing box having a shape and outer mold line (OML) to form a first portion of the wing extending from a wing root attached to the air frame along at least a portion of the wing span and extending aft along at least portion of the wing chord length;
 a skin attached to the wing box, said skin having a shape and OML of a second portion of the wing;
 a plurality of plates when assembled having the shape and OML of at least a sub-portion of the second portion of the wing, said plates affixed to corresponding locations on said skin, said skin folds between said plates for storage in a constrained volume within the wing box; and
 an inflation mechanism in the wing box configured to inflate and unfold the skin to form said second portion of the wing and thereby assemble the plates to reinforce said sub-portion of the wing.

2. The wing of claim 1, wherein plates are affixed to corresponding locations on the inside of the skin.

3. The wing of claim 1, wherein said first portion of the wing formed by said wing box includes the leading edge extending from the wing root, said second portion of the wing is aft of said first portion to increase wing chord length, said sub-portion including at least the trailing edge of the wing.

4. The wing of claim 1, wherein the first portion of the wing formed by said wing box includes a center region extending from the wing root, said second portion extending, both forward and aft to increase wing chord length, said sub-portion including at least the leading edges and trailing edges of the wing.

5. The wing of claim 1, wherein the sub-portion reinforced by said plates covers the entire second portion.

6. The wing of claim 1, wherein the skin is formed from a material selected from a fabric, elastomer, and shape memory polymer (SMP) or SMP composite.

7. The wing of claim 1, wherein the plates are formed from a solid material selected from metal, ceramic, and composite.

8. The wing of claim 1, wherein only the plates are affixed to the skin.

9. The wing of claim 1, wherein said inflation mechanism inflates the skin with foam to reinforce the second portion of the wing.

10. A wing for deployment from an air frame, comprising:
a wing box having a telescoping structure, said wing box having a shape and outer mold line (OML), said wing box extending lengthwise from the air frame to form a first portion of the wing extending from a wing root attached to the air frame along a leading edge of at least a portion of the wing span and extending aft along the wing chord length;
a deployment mechanism that extends the telescoping structure of the wing box to increase wing span, said telescoping structure forming a center region of the extended wing,
a skin attached to the wing box and said telescoping structure, said in having a shape and OML of a second portion of the wing including a leading edge forward of the center region and a trailing edge aft of the center region;
a plurality of plates when assembled having the shape and OML of at least a sub portion of the second portion of the wing, said plates affixed to corresponding locations on said skin, said skin and plates folded and stored in a constrained volume with the wing box; and
an inflation mechanism in the wing box configured to inflate the skin to form said second portion of the wing and thereby assemble the plates to reinforce said sub-portion including at least the trailing edge of the wing along the increased wing span.

11. The wing of claim 10, wherein the second deployment mechanism extends the telescoping structure to its full extent and then the inflation mechanism inflates the skin.

12. The wing of claim 10, wherein said skin is segmented into cells, said deployment mechanism extending the telescoping structure incrementally as said inflation mechanism extrudes foam to fill the cells sequentially.

13. A wing for deployment from an air frame, comprising:
a wing box having a shape and outer mold line (OML) to form a first portion of the wing extending from a wing root attached to the air frame along at least a portion of the wing span and extending aft along at least portion of the wing chord length;
a skin attached to the wing box, said skin having a shape and OML of a second portion of the wing;
a plurality of plates when assembled having the shape and OML of at least a sub-portion of the second portion of the wing, said plates affixed to corresponding locations on said skin, said skin and plates folded and stored in a constrained volume with the wing box; and
an inflation mechanism in the wing box configured to inflate the skin to form said second portion of the wing and thereby assemble the plates to reinforce said sub-portion of the wing,
wherein the plates have a flat stored state and a curved deployed state corresponding to the shape of the wing at their respective locations on the skin, further comprising means to heat the plates to transition them from their flat stored state to their curved deployed state.

14. A wing for deployment from an air frame, comprising:
a wing box retracted within said airframe, said wing box having a shape and outer mold line (OML);
a deployment mechanism on the air frame to deploy the rigid wing box to extend lengthwise from the air frame to form a first portion of the wing extending, from a wing root attached to the air frame along a leading edge of the wing span and extending aft along at least portion of the wing chord length;
a skin attached aft to the wing box, said skin having a shape and OML of a second portion to increase wing chord length and form the trailing edge of the wing;
a plurality of plates when assembled having the shape and OML of at least a sub-portion of said second portion including at least the trailing edge of the wing, said plates affixed to corresponding locations on the inside of said skin, said skin folds between said plates for storage in a constrained volume within the wing box; and
an inflation mechanism in the wing box configured to deploy, inflate and unfold the skin to form a second portion of the wing aft of the wing box to increase the wing chord length and thereby assemble the plates to reinforce said sub-portion including, at least the trailing edge of the wing.

15. The wing of claim 14, wherein only said solid plates are affixed to the skin.

16. A wing for deployment from an air frame, comprising
a wing hex retracted within said airframe, said wing box having a shape and outer mold line (OML);
a first deployment mechanism on the air frame to deploy the rigid, wing box to extend lengthwise from the air frame to form a first center portion of the wing extending from a wing root attached to the air frame and extending aft along the wing chord length;
a skin attached forward and aft of the wing box, said skin having a shape and OML of a second portion to form a leading edge forward of the wing box and a trailing edge aft;
a plurality of plates when assembled having the shape and OML of at least a sub-portion of said second portion including at least the trailing edge of the wing, said plates affixed to corresponding locations on the inside of said skin, said skin and folds between said plates for storage in a constrained volume within the wing box; and
an inflation mechanism in the wing box configured to inflate and unfold the skin to form a second portion of the wing forward and aft of the deployed wing box to extend the chord length and thereby assemble the plates to reinforce said sub-portion including at least the trailing edge of the wing.

17. The wing of claim 16, wherein said sub-portion includes a leading edge of the wing, forward of the wing box.

18. A wing for deployment from an air frame, comprising:
a wing box having a telescoping structure retracted within said airframe, said wing box having a shape and outer mold line (OML);

a first deployment mechanism on the air frame to deploy the rigid wing box to extend lengthwise from, the air frame to form a first portion of the wing extending from a wing root attached to the air frame along a leading edge of at least a portion of the wing span and extending aft along the wing chord length;

a second deployment mechanism for extending the telescoping structure of the wing box along the wing span, said telescoping structure forming an extended center region of the wing;

a skin attached to the wing box and telescoping structure, said skin having a shape and OML second portion to form a leading edge forward of the center region and a trailing edge aft;

a plurality of plates when assembled having the shape and OML of at least a sub-portion of said second portion including at least the trailing edge of the wing, said plates affixed to corresponding locations on said skin, said skin and plates folded and stored in a constrained volume with the wing box; and an inflation mechanism in the wing box configured to inflate the skin with foam to form a solid second portion of the wing forward and of the telescoped structure to extend the wing span and thereby assemble the plates to reinforce said sub-portion including at least the trailing edge of the wing.

19. The wing of claim 18, wherein the sub-portion reinforced by said plates covers the entire second portion.

20. The wing of claim 18, wherein the wing span of said first and second portions of the wing is at least twice the wing span of the first portion of the wing.

21. The wing of claim 18, wherein the second deployment mechanism extends the telescoping structure to its full extent and then the inflation mechanism inflates the skin.

22. The wing of claim 21, wherein said skin is segmented into cells, said second deployment mechanism extending the telescoping structure incrementally as said inflation mechanism extrudes foam to fill the cells sequentially.

* * * * *